(12) United States Patent
Feng et al.

(10) Patent No.: US 11,500,721 B2
(45) Date of Patent: Nov. 15, 2022

(54) SOLID-STATE DISK AND READING AND WRITING METHOD THEREOF

(71) Applicant: INNOGRIT TECHNOLOGIES CO., LTD., Shanghai (CN)

(72) Inventors: Zhengtian Feng, Shanghai (CN); Jie Chen, San Jose, CA (US); Ke Wei, Shanghai (CN); Jing Gao, Shanghai (CN); Tao Wei, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 64 days.

(21) Appl. No.: 17/103,984

(22) Filed: Nov. 25, 2020

(65) Prior Publication Data
US 2022/0156142 A1  May 19, 2022

(30) Foreign Application Priority Data

Oct. 20, 2020  (CN) .......................... 202011123714.3

(51) Int. Cl.
| | |
|---|---|
| *G06F 11/14* | (2006.01) |
| *G06F 11/10* | (2006.01) |
| *G06F 3/06* | (2006.01) |
| *G06F 11/07* | (2006.01) |

(52) U.S. Cl.
CPC ........ *G06F 11/1068* (2013.01); *G06F 3/0619* (2013.01); *G06F 3/0653* (2013.01); *G06F 3/0679* (2013.01); *G06F 11/0772* (2013.01); *G06F 11/1435* (2013.01)

(58) Field of Classification Search
CPC .............. G06F 11/1068; G06F 3/0619; G06F 11/1435; G06F 3/0653; G06F 3/0679; G06F 11/0772; G06F 3/064; G06F 3/0659; G06F 12/02; G06F 3/061; G06F 3/0658; G06F 12/1009
USPC ........................................................ 714/763
See application file for complete search history.

(56) References Cited

U.S. PATENT DOCUMENTS

| | | | |
|---|---|---|---|
| 6,611,938 B1 * | 8/2003 | Tanaka ................. | G11C 7/1006 714/763 |
| 8,612,830 B2 * | 12/2013 | Kitahara ............. | G06F 11/1068 714/764 |
| 8,898,548 B1 * | 11/2014 | Mullendore ........ | G06F 11/1048 714/751 |
| 10,884,847 B1 * | 1/2021 | Champoux ............. | G06F 7/584 |

(Continued)

*Primary Examiner* — Albert Decady
*Assistant Examiner* — Enam Ahmed
(74) *Attorney, Agent, or Firm* — Leydig, Voit & Mayer, Ltd.

(57) ABSTRACT

A reading method for solid-state disk returns data and/or information depending on state information. A data unit stored in the solid-state disk comprises metadata and a plurality of sectors including at least two sectors of user data, the metadata comprising a sector state set indicating state information of each of the sectors in the data unit, and the state information comprising a valid state and an invalid state. In response to receiving a read command from a host to read at least one of the sectors in the data unit, the solid-state disk returns actual data to the host for one or more of the sectors in the valid state, and returns information indicating a read error to the host for one or more of the sectors in the invalid state, according to the sector state set stored in the metadata of the data unit.

12 Claims, 2 Drawing Sheets

(56) References Cited

U.S. PATENT DOCUMENTS

| | | | | |
|---|---|---|---|---|
| 2005/0246612 | A1* | 11/2005 | Leis | G06F 11/0727 |
| | | | | 714/763 |
| 2007/0271494 | A1* | 11/2007 | Gorobets | G06F 11/1068 |
| | | | | 714/763 |
| 2009/0327837 | A1* | 12/2009 | Royer | G06F 12/0866 |
| | | | | 714/763 |
| 2011/0072331 | A1* | 3/2011 | Sakaue | G06F 11/1012 |
| | | | | 714/763 |
| 2011/0099326 | A1* | 4/2011 | Jung | G06F 3/0679 |
| | | | | 711/E12.001 |
| 2013/0198586 | A1* | 8/2013 | Koike | G11B 20/1803 |
| | | | | 714/763 |
| 2013/0332796 | A1* | 12/2013 | Ellis | G06F 11/1048 |
| | | | | 714/763 |
| 2014/0173268 | A1* | 6/2014 | Hashimoto | G06F 3/0647 |
| | | | | 713/2 |
| 2016/0172034 | A1* | 6/2016 | Oh | G11C 13/0069 |
| | | | | 714/763 |
| 2018/0089088 | A1* | 3/2018 | Jakowski | G06F 12/0607 |
| 2019/0146867 | A1* | 5/2019 | Flynn | G06F 11/1068 |
| | | | | 714/763 |
| 2020/0363997 | A1* | 11/2020 | Li | G06F 3/0659 |

\* cited by examiner

SOLID-STATE DISK AND READING AND WRITING METHOD THEREOF

CROSS-REFERENCE TO PRIOR APPLICATIONS

Priority is claimed to German Patent Application No. CN 2020111237143, filed on Oct. 20, 2020, the entire disclosure of which is hereby incorporated by reference herein.

FIELD

The present disclosure herein relates to solid-state disk, and particularly to read and write technology of the solid-state disk.

BACKGROUND

Solid-state disk (SSD), also known as solid-state drive, is a computer storage device that mainly uses flash memory (NAND) as non-volatile memory. The solid-state disk is connected to a host and executes read and write commands from the host. There is a mapping table stored in a flash translation layer (FTL) of the solid-state disk. The table saves the correspondence between a logical address (LDA) and a physical address (PDA) on the NAND, and is used for reading and writing data. The unit for reading and writing data on the host side is a sector, and the size of each sector is 512 byte or 4 KB. The unit for reading and writing data on the NAND is a data unit (DU) which is also basic unit of the FTL mapping table, the size of the DU is 4 KB (it can also be configured to other sizes, such as 8 KB, etc.). When the sector adopts 512 byte, multiple sectors correspond to one DU because the host and the NAND read and write data in different unit. When the host needs to write into a sector, it will use the values of a certain DU as basic data, modify the values of one of the sectors, and then write the new and old data combination into the DU. When there is an error map (mapping relationship is invalid) in the DU, if directly writing into a sector and using it as a normal DU, it will cause that the values of the other sectors of the DU read by the host are wrong. At this time, a method is needed to inform the host whether the received data is correct.

There are two solutions in the existing technology:

Solution 1: change the basic mapping unit of the FTL mapping table to a sector, that is, one basic mapping unit corresponds to one sector. The problem with this solution is that it will greatly increase the FTL mapping table and occupy more resources. For example, when the size of each sector is 512 bytes, if the basic mapping unit of the FTL mapping table is changed to a sector, the FTL mapping table will be increased to 8 times compared to the case in which the basic mapping unit DU of the original FTL mapping table is 4 KB.

Solution 2: reject the HOST command, and the HOST would resend the command after the HOST knows it. The problem with this solution is that it will increase read and write time and repeat unnecessary operations.

SUMMARY

In an embodiment, the present invention a reading method for solid-state disk which returns data and/or information depending on state information. A data unit stored in the solid-state disk comprises metadata and a plurality of sectors including at least two sectors of user data, the metadata comprising a sector state set indicating state information of each of the sectors in the data unit, and the state information comprising a valid state and an invalid state. In response to receiving a read command from a host to read at least one of the sectors in the data unit, the solid-state disk returns actual data to the host for one or more of the sectors in the valid state, and returns information indicating a read error to the host for one or more of the sectors in the invalid state, according to the sector state set stored in the metadata of the data unit.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
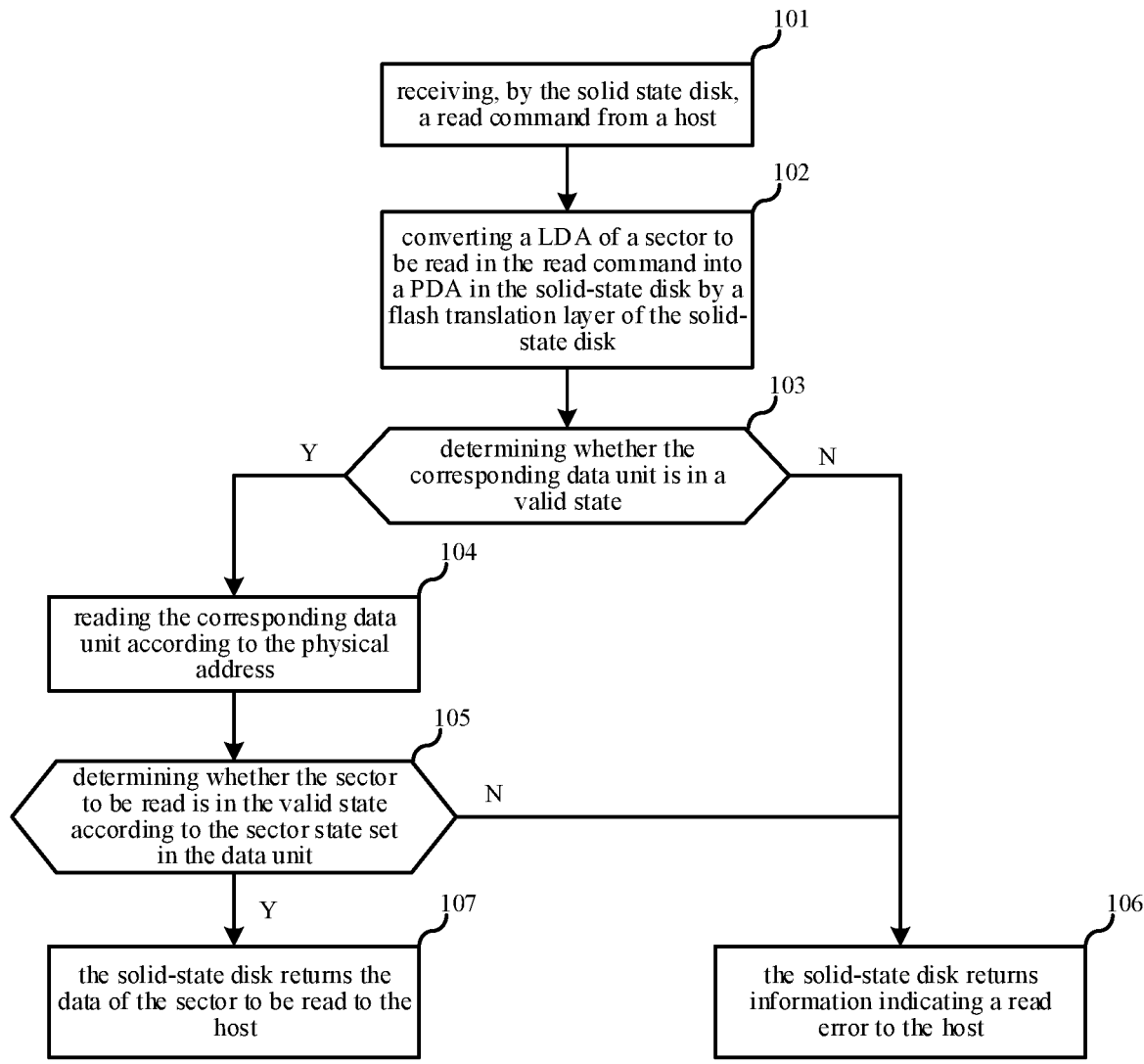
FIG. 1 is a schematic flowchart of a reading method for solid-state disk according to a first embodiment of the present disclosure.

Embodiments of the present invention provide a solid-state disk and a reading and writing method thereof to complete the operation of writing a sector-sized data into a data unit marked with an error map without increasing the volume of the FTL mapping table, without rejecting the host command, and without affecting the determination of correctness of the read data.

In an embodiment, the present application provides a reading method for solid-state disk, each data unit stored in the solid-state disk comprises metadata and at least two sectors of user data, the metadata comprises a sector state set indicating state information of each sector in the data unit, the state information comprises a valid state and an invalid state; the method comprises:

when receiving a read command from a host to read at least one of the sectors in a data unit, the solid-state disk returns actual data to the host for the sector in the valid state and returns information indicating a read error to the host for the sector in the invalid state according to the sector state set stored in the metadata of the data unit.

In a preferred example, the step of the solid-state drive returning the actual data to the host for the solid-state disk for the sector in the valid state and returning information indicating a read error to the host for the sector in the invalid state according to the sector state set stored in the metadata of the data unit further comprises:

converting a logical address of the sector to be read in the read command into a physical address in the solid-state disk by a flash translation layer of the solid-state disk, and reading the corresponding data unit according to the physical address;

determining whether the corresponding data unit is in a valid state by the flash translation layer;

if the corresponding data unit is in the valid state, further determining whether the sector to be read is in the valid state according to the sector state set in the data unit, and returning actual data to the host if the sector is in the valid state and returning information indicating a read error to the host if the sector is in the invalid state;

if the corresponding data unit is in an invalid state, returning information indicating a read error to the host.

In a preferred example, the sector state set is a bitmap, and each bit in the bitmap is used for indicating the state information of one sector.

In a preferred example, the step of the "determining whether the sector to be read is in the valid state according to the sector state set in the data unit, and returning actual data to the host if the sector is in the valid state and returning information indicating a read error to the host if the sector is in the invalid state" is implemented by firmware in the solid-state disk.

In another embodiment, the present invention provides a writing method for solid-state disk, each data unit stored in the solid-state disk comprises metadata and at least two sectors of user data, the metadata comprises a sector state set indicating state information of each sector in the data unit, the state information comprises a valid state and an invalid state; the method comprises:

reading a data unit by the solid-state disk when receiving a write command from a host to write data into some sectors in the data unit;

replacing the user data of the corresponding sector in the read data unit with the data to be written into the sector to obtain a data unit to be written, and setting the sector to be valid state and keeping other sectors with their previous state in the sector state set of the data unit to be written;

writing the data unit to be written into the storage medium of the solid-state disk.

In a preferred embodiment, the step of the solid-state disk reading the data unit further comprises:

converting a logical address of the sector to be written in the write command into a physical address in the solid-state disk by a flash translation layer of the solid-state disk, and reading the corresponding data unit according to the physical address.

In a preferred example, the sector state set is a bitmap, and each bit in the bitmap is used for indicating the state information of one sector.

In another embodiment, the present invention provides a solid-state disk. The solid-state disk comprises a storage medium and a controller;

each data unit stored in the solid-state disk comprises metadata and at least two sectors of user data, the metadata comprises a sector state set indicating state information of each sector in the data unit, the state information comprises a valid state and an invalid state;

the controller is used to execute the reading method described above and/or the writing method described above.

In a preferred example, the storage medium is a flash memory.

In a preferred example, the controller comprises a hardware chip and firmware.

In the embodiments of the present invention, the metadata is used to save quality information of the sectors, which improves read and write performance. It does not need to increase the FTL mapping table, which saves resources, and reduces failure of the host to process read and write commands, which improves read and write performance. In addition, software and hardware are used for error handling to reduce the time required for error handling and improve read and write performance.

A large number of technical features are described in the specification of the present application, and are distributed in various technical solutions. If a combination (i.e., a technical solution) of all possible technical features of the present application is listed, the description may be made too long. In order to avoid this problem, the various technical features disclosed in the above summary of the present application, the technical features disclosed in the various embodiments and examples below, and the various technical features disclosed in the drawings can be freely combined with each other to constitute various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

In the following description, numerous technical details are set forth in order to provide the reader with a better understanding of the present application. However, those skilled in the art can understand that the technical solutions claimed in the present application can be implemented without these technical details and various changes and modifications based on the following embodiments.

Explanation of some concepts:

DU: Data unit, refers to the smallest unit of the FTL mapping correspondence. HOST: such as a computer host.

NAND: Flash memory, also known as NAND Flash memory, is a non-volatile storage medium that can be used as a storage medium for the solid-state disk.

FTL: Flash Translation Layer, refers to the conversion of HOST logical address to NAND physical address.

META: Metadata, refers to information describing data attributes.

SECTOR: the smallest unit for the host to read and write data.

LDA: Logic DU Address.

PDA: Physical DU Address.

In order to make the objects, technical solutions and advantages of the present application more clear, embodiments of the present application will be further described in detail below with reference to the accompanying drawings.

The first embodiment of the present invention relates to a reading method for solid-state disk, each data unit of the solid-state disk comprises metadata and at least two sectors of user data, the metadata comprises a sector state set indicating state information of each sector in the data unit, the state information comprises a valid state and an invalid state. When receiving a read command from the host to read at least one of the sectors in the data unit, the solid-state disk returns actual data to the host for the sector of the valid state and returns information indicating a read error to the host for the sector of the invalid state according to the sector state set stored in the metadata of the data unit.

In one embodiment, the sector state set is a bitmap, and each bit in the bitmap is used for indicating the state information of one sector. Each bit in the bitmap of a data unit has a one-to-one correspondence with each sector in the data unit. Each sector uses a bit to indicate the state (for example, 0 represents the valid state, 1 represents the invalid state, of course, 1 may be used to represent the valid state, 0 may be used to represent the invalid state, as long as it is agreed in advance) to save storage space. In other embodiments, the sector state set may also be another type of data structure. For example, a more redundant manner (such as error correction code) may be used to store the state information of each sector. The present disclosure does not limit the specific form of the sector state set, as long as the state information of each sector can be stored.

In one embodiment, as shown in FIG. 1, the reading method for the solid-state disk comprises:

In step 101, receiving, by the solid-state disk, a read command from a host.

In step 102, converting a logical address (LDA) of a sector to be read in the read command into a physical address (PDA) in the solid-state disk by a flash translation layer of the solid-state disk.

The mapping table in the solid-state disk records the correspondence between LDA and PDA, there are two main cases:
1. LDA→normal PDA, that is a certain physical address in the specific NAND storage medium.
2. LDA→PDA_err, wherein the PDA_err refers to a specific value representing the error map, for example, the PDA_err can be represented by a 32-bit maximum value of 0×FFFFFFFF.

In step 103, determining whether the corresponding data unit is in a valid state by the flash translation layer (in one embodiment, it can be determined whether a data unit is invalid according to the information in the FTL mapping table). If the corresponding data unit is in the valid state, the process proceeds to step 104; if the corresponding data unit is in the invalid state (for example, the physical address is the PDA_err), the process proceeds to step 106, and the solid-state disk returns information indicating a read error to the host.

In step 104, reading the corresponding data unit according to the physical address.

In step 105, further determining whether the sector to be read is in the valid state according to the sector state set in the data unit (for example, the value of the bit corresponding to the sector to be read in the bitmap is 0 or 1). If the sector is in the valid state, the process proceeds to step 107, the solid-state disk returns the data of the sector to be read to the host. If the sector to be read is invalid, the process proceeds to step 106, the solid-state disk returns information indicating a read error to the host.

Preferably, the above steps can be implemented by a hardware and firmware of the solid-state disk in cooperation. The hardware refers to a chip of the solid-state disk controller, and the firmware refers to programs that work on the solid-state disk for control. In one embodiment, step 105 can be implemented by both the hardware and the firmware. The hardware firstly performs a preliminary check, if the hardware finds an invalid sector, the firmware performs a careful check so as to avoid performance degradation caused by the firmware directly checking each data unit. Optionally, the above steps can also be implemented entirely by the hardware or entirely by the firmware. In one embodiment, the hardware of the solid-state disk may be a logic circuit.

The second embodiment of the present invention relates to a writing method for solid-state disk (which can be used in combination with the reading method for the solid-state disk of the first embodiment), each data unit of the solid-state disk comprises metadata and at least two sectors of user data, the metadata comprises a sector state set indicating state information of each sector in the data unit, the state information comprises a valid state and an invalid state.

In one embodiment, the sector state set is a bitmap, and each bit in the bitmap is used for indicating the state information of one sector. Each sector adopts a bit to indicate the state (for example, 0 represents the valid state, 1 represents the invalid state) to save storage space. In other embodiments, the sector state set may also be another type of data structure. For example, a more redundant manner (such as error correction code) may be used to store the state information of each sector. The present disclosure does not limit the specific form of the sector state set, as long as the state information of each sector can be stored.

Figure 2:
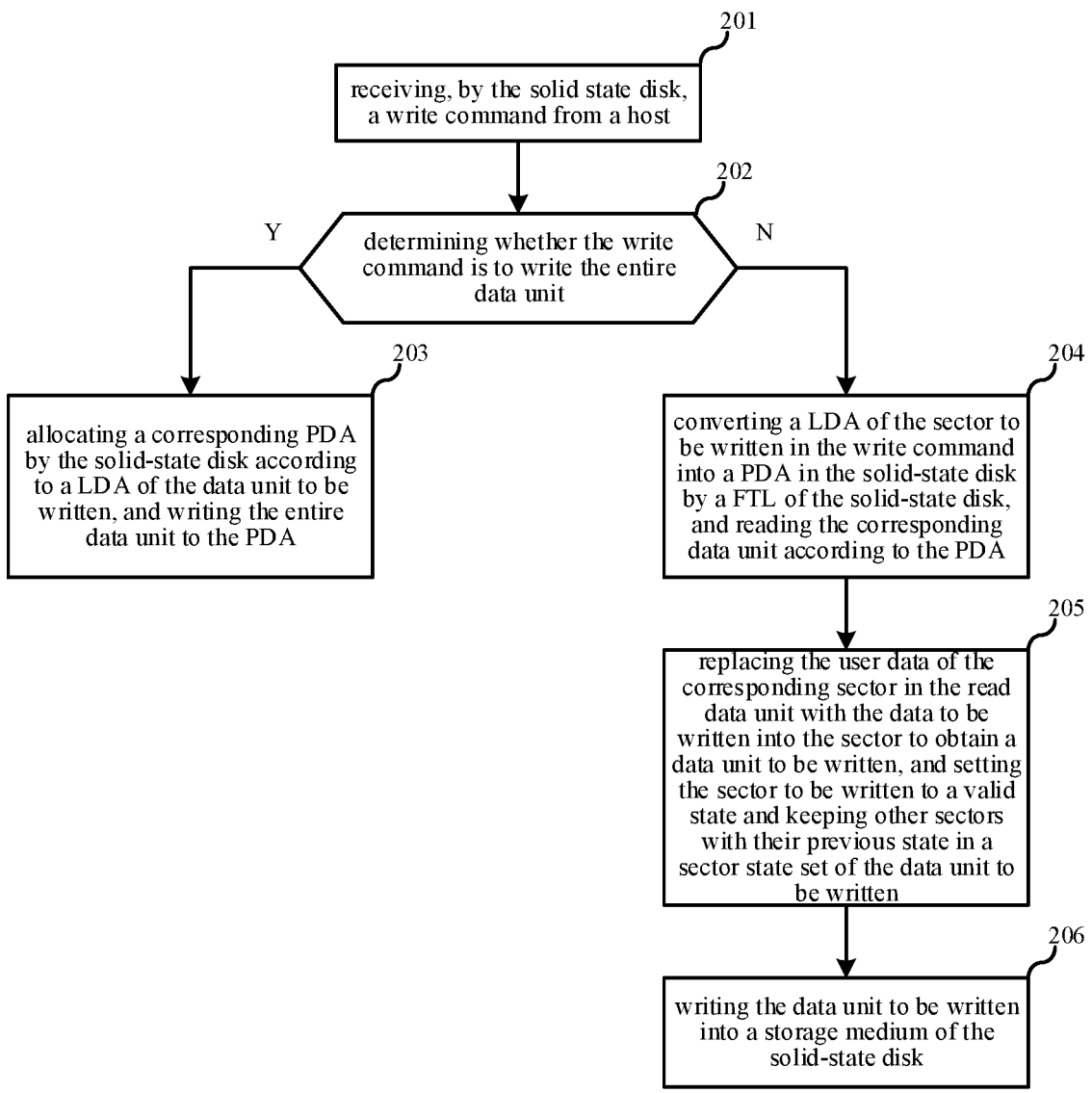
FIG. 2 is a schematic flowchart of a reading method for solid-state disk according to a second embodiment of the present disclosure

In an embodiment, as shown in FIG. 2, the writing method for the solid-state disk specifically includes following steps:

In step 201, receiving a write command from a host.

In step 202, determining, by the solid-state disk, whether the write command is to write the entire data unit, if yes, the process proceeds to step 203, otherwise the process proceeds to step 204.

In step 203, allocating a corresponding physical address (PDA) by the solid-state disk according to the logical address (LDA) of the data unit to be written, and writing the entire data unit to the physical address, wherein the bitmap in the metadata of the data unit to be written is all 0s (valid state).

In step 204, for the case in which the write command is to write data into some sectors (or a part of the sectors) in the data unit, converting a logical address of the sector to be written in the write command into a physical address in the solid-state disk by a flash translation layer (FTL) of the solid-state disk, and reading the corresponding data unit according to the physical address. The data unit includes not only the sectors to be written, but also other sectors, as well as the metadata (including bitmap) of the data unit.

In step 205, replacing the user data of the corresponding sector in the read data unit with the data to be written into the sector to obtain a data unit to be written, and setting the sector to be written to the valid state and keeping other sectors with their previous state in the sector state set of the data unit to be written.

In step 206, writing the data unit to be written into a storage medium of the solid-state disk, wherein the data unit to be written includes a bitmap.

Specifically, here can be subdivided into three situations:
1. If the original LDA corresponds to a certain PDA, under normal circumstances, its bitmap is all 0, which means that all are valid. The data part is read-modified-written, and the bitmap part is still all 0s.
2. If the original LDA corresponds to a certain PDA, its bitmap is not all 0s, which means it is partially valid. The data part is read-modified-written, and the bitmap part is also read-modified-written, and the whole is written to the NAND.
3. If the original LDA does not correspond to a certain PDA, but corresponds to the PDA_err, then the bitmap is initialized to all 1s. Clear the position of the bitmap corresponding to the newly written sector to 0, indicating that the sector is valid, and the unwritten sector is still 1, indicating that the sector is invalid. Write new data and bitmap to NAND together.

Preferably, the above steps can be implemented by the hardware and firmware of the solid-state disk. Optionally, the above steps can also be completely implemented by the hardware of the solid-state disk or by the firmware of the solid-state disk.

The third embodiment of the present invention relates to a solid-state disk, which includes a storage medium and a controller. The storage medium is a flash memory. The controller includes a hardware chip and firmware.

Each data unit stored in the solid-state disk comprises metadata and at least two sectors of user data, the metadata comprises a sector state set indicating state information of each sector in the data unit, the state information comprises a valid state and an invalid state.

The controller is used to execute the reading method described in the first embodiment and/or the writing method described in the second embodiment.

It should be noted that in the application documents of the present patent, relational terms such as first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a plurality of elements includes not only those elements but also Other elements, or elements that are inherent to such a process, method, item, or device. Without more restrictions, the element defined by the phrase "include one" does not exclude that there are other identical elements in the process, method, article or equipment that includes the element. In the application file of this patent, if it is mentioned that an action is performed according to an element, it means the meaning of performing the action at least according to the element, and includes two cases: the behavior is performed only on the basis of the element, and the behavior is performed based on the element and other elements. Multiple, repeatedly, various, etc., expressions include 2, twice, 2 types, and 2 or more, twice or more, and 2 types or more types.

The specification includes combinations of the various embodiments described herein. Separate references to embodiments (such as "one embodiment" or "some embodiments" or "preferred embodiments") do not necessarily refer to the same embodiment; however, these embodiments are not mutually exclusive unless indicated as mutually exclusive or clearly mutually exclusive by those skilled in the art. It should be noted that unless the context clearly indicates or requires otherwise, the word "or" is used in this specification in a non-exclusive sense.

All documents mentioned in the disclosure are considered to be included in the disclosure of the disclosure as a whole, so that they can be used as a basis for modification when necessary. In addition, it should be understood that after reading the content of the present disclosure, those skilled in the art can make various changes or modifications to the present disclosure, and these equivalent forms also fall within the scope of protection claimed by the present disclosure.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A reading method for solid-state disk, wherein a data unit stored in the solid-state disk comprises metadata and a plurality of sectors including at least two sectors of user data, the metadata comprising a sector state set indicating state information of each of the sectors in the data unit, and the state information comprising a valid state and an invalid state, the method comprising:

in response to receiving a read command from a host to read at least one of the sectors in the data unit, determining that the data unit is in a valid state, wherein it is further determined whether the sectors to be read are in the valid or the invalid state according to the sector state set stored in the metadata of the data unit, and, for the sector or sectors determined to be in the valid state, actual data is returned to the host, and, for the sector or sectors determined to be in the invalid state, information indicating a read error is returned to the host.

2. The reading method for solid-state disk according to claim 1, further comprising:

converting a logical address of each of the sectors to be read in the read command into a physical address in the solid-state disk by a flash translation layer of the solid-state disk, and reading the data unit according to the physical addresses; and determining that the data unit is in the valid state or by the flash translation layer.

3. The reading method for solid-state disk according to claim 1, wherein the sector state set is a bitmap, and each bit in the bitmap is used for indicating the state information of one of the sectors.

4. The reading method for solid-state disk according to claim 1, wherein firmware in the solid-state disk is used for determining whether the sectors to be read are in the valid state according to the sector state set in the data unit, and returning the actual data to the host for the sector in the valid state and returning the information indicating the read error to the host for the sector in the invalid state.

5. A writing method for solid-state disk, the method comprising:

reading a data unit stored in the solid-state disk in response to receiving a write command from a host to write data into one of a plurality of sectors in the data unit, the data unit stored in the solid-state disk comprising metadata and the plurality of sectors including at least two sectors of user data, the metadata comprising a sector state set indicating state information of each of the sectors in the data unit, and the state information comprising a valid state and an invalid state;

replacing the user data of a corresponding one of the sectors in the read data unit with the data to be written into the sector to obtain a data unit to be written, and setting the sector to be written to be in the valid state and keeping other ones of the sectors with their previous state in the sector state set of the data unit to be written; and writing the data unit to be written into the storage medium of the solid-state disk.

6. The writing method for solid-state disk according to claim 5, wherein the reading the data unit by the solid-state disk further comprises:

converting a logical address of the sector to be written in the write command into a physical address in the solid-state disk by a flash translation layer of the solid-state disk, and reading the data unit according to the physical address.

7. The writing method for solid-state disk according to claim 5, wherein the sector state set is a bitmap, and each bit in the bitmap is used for indicating the state information of one of the sectors.

8. A solid-state disk, wherein a data unit stored in the solid-state disk comprises metadata and a plurality of sectors including at least two sectors of user data, the metadata comprising a sector state set indicating state information of each of the sectors in the data unit, and the state information comprising a valid state and an invalid state, the solid-state disk comprising:

a storage medium; and a controller configured to execute the following steps:

in response to receiving a read command from a host to read at least one of the sectors in the data unit, determining that the data unit is in a valid state, wherein it is further determined whether the sectors to be read are in the valid or the invalid state according to the sector state set stored in the metadata of the data unit, and, for the sector or sectors determined to be in the valid state, actual data is returned to the host, and, for the sector or sectors determined to be in the invalid state, information indicating a read error is returned to the host.

9. The solid-state disk according to claim 8, wherein the storage medium is a flash memory.

10. The solid-state disk according to claim 8, wherein the controller comprises a hardware chip and firmware.

11. The solid-sate disk according to claim 8, wherein the controller is further configured to provide for execution of the following steps:

reading the data unit by the solid-state disk in response to receiving a write command from a host to write data into one or some of the sectors in the data unit;

replacing the user data of a corresponding one of the sectors in the read data unit with the data to be written into the sector to obtain a data unit to be written, and setting the sector to be written to be in the valid state and keeping other ones of the at least two sectors with their previous state in the sector state set of the data unit to be written; and writing the data unit to be written into the storage medium of the solid-state disk.

12. The writing method for solid-state disk according to claim 5, wherein the write command is to write data into some of the sectors and the user data is replaced in corresponding ones of the sectors.

* * * * *